(12) United States Patent
Loyola et al.

(10) Patent No.: US 11,686,947 B2
(45) Date of Patent: Jun. 27, 2023

(54) STRUCTURAL FIBER COMPONENT FOR INJECTION MOLDING IN HEAD MOUNTED DISPLAYS

(71) Applicant: Microsoft Technology Licensing, LLC, Redmond, WA (US)

(72) Inventors: Bryan Richard Loyola, San Jose, CA (US); Brian J. Toleno, Cupertino, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 378 days.

(21) Appl. No.: 16/884,740

(22) Filed: May 27, 2020

(65) Prior Publication Data

US 2021/0373344 A1 Dec. 2, 2021

(51) Int. Cl.
| | |
|---|---|
| *G02B 27/01* | (2006.01) |
| *B29C 51/00* | (2006.01) |
| *B29C 70/46* | (2006.01) |
| *B29C 70/48* | (2006.01) |
| *B29D 12/02* | (2006.01) |

(Continued)

(52) U.S. Cl.
CPC ........ *G02B 27/0176* (2013.01); *B29C 51/004* (2013.01); *B29C 70/465* (2013.01); *B29C 70/48* (2013.01); *B29D 12/02* (2013.01); *G02B 27/0172* (2013.01); *G02C 5/008* (2013.01); *G02C 5/18* (2013.01); *G02C 11/10* (2013.01); *B29K 2101/12* (2013.01);
(Continued)

(58) Field of Classification Search
CPC ..... B29C 51/004; B29C 70/465; B29C 70/48; B29D 12/02; G02B 27/0172; G02B 2027/0178; G02B 27/0176; G02B 27/017; G02B 27/01; B29K 2101/12; B29K 2707/04; G02C 5/008; G02C 5/18; G02C 5/14; G02C 11/10; G02C 11/00; B29L 2012/005; B29L 2012/00
USPC .............................. 359/13; 351/11, 117, 129
See application file for complete search history.

(56) References Cited

U.S. PATENT DOCUMENTS

| | | | |
|---|---|---|---|
| 2010/0309424 A1* | 12/2010 | Bozzetto ................ | B29D 12/02 351/111 |
| 2013/0258270 A1* | 10/2013 | Cazalet .................. | G02C 5/008 351/158 |

(Continued)

FOREIGN PATENT DOCUMENTS

WO        2009080444 A1    7/2009

OTHER PUBLICATIONS

"International Search Report and Written Opinion Issued in PCT Application No. PCT/US21/023377", dated Jul. 13, 2021, 12 Pages.

*Primary Examiner* — William R Alexander
(74) *Attorney, Agent, or Firm* — Calfee, Halter & Griswold LLP

(57) ABSTRACT

A set of augmented reality (AR) or virtual reality (VR) glasses are disclosed. The glasses comprise a fiber reinforced structure. The fiber reinforced structure includes a continuous fiber component. The fiber reinforced structure also includes a thermoplastic material injection molded over the continuous fiber component, wherein the thermoplastic material surrounds the continuous fiber component. The glasses also comprise electronics that are coupled to the fiber reinforced structure, wherein the electronics are configured to facilitate presentment of imagery onto a lens of the glasses.

20 Claims, 6 Drawing Sheets

(51) Int. Cl.
   *G02C 5/00*      (2006.01)
   *G02C 5/18*      (2006.01)
   *G02C 11/00*     (2006.01)
   *B29L 12/00*     (2006.01)
   *B29K 101/12*    (2006.01)
   *B29K 707/04*    (2006.01)

(52) U.S. Cl.
   CPC ..... *B29K 2707/04* (2013.01); *B29L 2012/005* (2013.01); *G02B 2027/0178* (2013.01)

(56) References Cited

U.S. PATENT DOCUMENTS

| | | | |
|---|---|---|---|
| 2015/0375478 A1* | 12/2015 | Gruhn | B29C 45/1671 |
| | | | 428/221 |
| 2016/0216532 A1* | 7/2016 | Tirindelli | G02C 5/18 |
| 2017/0200422 A1* | 7/2017 | Okamoto | G09G 3/2003 |
| 2017/0283539 A1* | 10/2017 | Shiga | C08F 255/04 |
| 2018/0136703 A1 | 5/2018 | Woods et al. | |
| 2019/0041666 A1 | 2/2019 | Abele et al. | |
| 2019/0377189 A1* | 12/2019 | Toleno | B29C 70/081 |
| 2021/0223577 A1* | 7/2021 | Zhang | H04R 5/0335 |
| 2021/0243518 A1* | 8/2021 | Zhang | H04R 1/38 |
| 2021/0274280 A1* | 9/2021 | Zhang | H04R 5/0335 |
| 2022/0139188 A1* | 5/2022 | Peyrard | A61B 5/746 |
| | | | 340/573.7 |

* cited by examiner

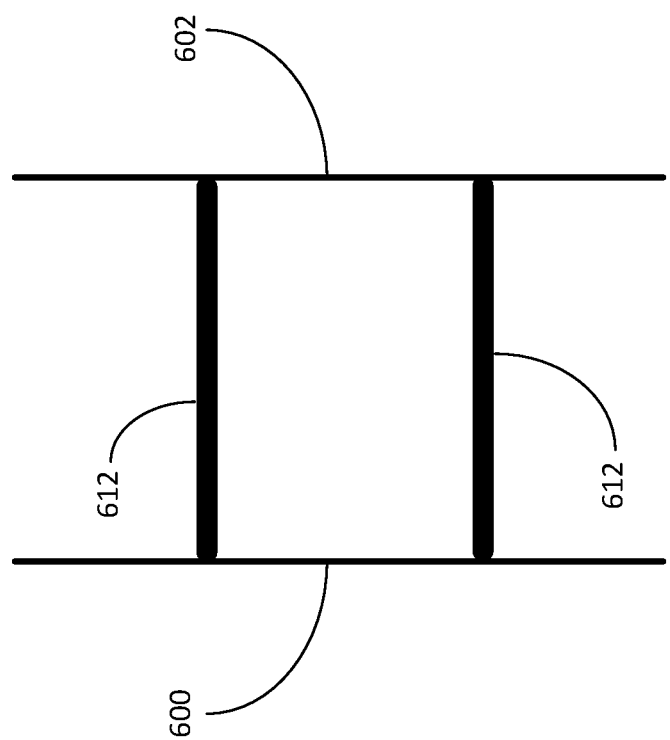

STRUCTURAL FIBER COMPONENT FOR INJECTION MOLDING IN HEAD MOUNTED DISPLAYS

BACKGROUND

Augmented reality (AR) glasses are configured to superimpose computer-generated imagery onto a user's view of the real world, thus providing a composite view. Virtual reality (VR) glasses are configured to present an entirely computer-generated environment to the user, thereby allowing the user to experience a different (virtual) reality. AR and VR glasses have become relatively popular and accessible to consumers (where a consumer can be an enterprise or individual user). Applications for AR and VR glasses include, but are not limited to, gaming, immersive experiences, disability assistance, surgical training, manufacturing instruction, and many more.

Because of the complexity involved with AR and VR glasses, such glasses can be relatively expensive. For example, a conventional set of AR glasses can include: 1) a frame and sidearms, which may be made of a woven fabric composite; 2) one or more microprocessors; 3) inertial sensors to detect position and orientation of the glasses relative to objects in the real world; 4) one or more cameras to identify objects in the surroundings of a user; 5) a projection system for projecting imagery (such as a laser display system); and 6) a see-through display surface that is also configured to present imagery projected by the projection system. A conventional set of VR glasses may include similar elements, except that the display surface of the set of VR glasses is not see-through in nature.

Due to the complexity (and thus expense) of AR and VR glasses, it is desirable to manufacture such glasses so that they do not break if, for example, the glasses slip from a user's fingers and impact the ground. Accordingly, as referenced above, frames and sidearms of an exemplary conventional set of AR glasses are formed of a woven fabric composite, as such composite provides advantageous structural performance (e.g., woven fabric composites tend to exhibit high strength with respect to their weight, and therefore frames made of a woven fabric composite may not break when dropped). Woven fabric composites, however, tend to be expensive when compared to plastics that are used in conventional eyewear. In addition, woven fabric composites tend to have higher densities than plastics, and manufacturing times when using woven fabric composites is longer when compared to plastic injection molding due to hand-based lay up techniques required for manufacturing with woven fabric composites. The relatively high density of woven fabric composites may result in a set of AR or VR glasses being uncomfortable for a user to wear for long periods of time.

Using plastic injection molding to manufacture portions of AR and VR glasses, however, also has disadvantages (that are somewhat unique to AR and VR glasses). For instance, as indicated above, forming portions of AR and VR glasses by way of plastic injection molding can result in parts with relatively low mechanical performance that can break relatively easily. Further, plastics conventionally fail to readily dissipate heat; therefore, heat generated by circuitry (such as a microprocessor, digital signal processor, application specific integrated circuit (ASIC), microcontroller, etc.) of AR or VR glasses is localized in plastic, creating hot spots that may cause discomfort to a user and/or may negatively impact the structural strength of the plastic.

SUMMARY

The following is a brief summary of subject matter that is described in greater detail herein. This summary is not intended to be limiting as to the scope of the claims.

Disclosed herein are various technologies pertaining AR and/or VR glasses that include a fiber reinforced structure, wherein the fiber reinforced structure comprises a continuous fiber component (which can act as an endoskeleton or an exoskeleton) and a thermoplastic material injection molded around the continuous fiber component or injected molded adjacent to the continuous fiber reinforcement (such that the continuous fiber component forms an external wall of the fiber reinforced structure). The fiber reinforced structure can be frames of AR glasses, sidearms of AR glasses, frames of VR glasses, sidearms of VR glasses, or other suitable structure included in AR and/or VR glasses.

Forming the fiber reinforced structure can include shaping and cutting the continuous fiber component to a desired form, and subsequently inserting the formed continuous fiber component into a mold. The thermoplastic material is then injected into the mold to surround the continuous fiber component. The thermoplastic material then cools and hardens in the mold to form the structure, and upon cooling is removed from the mold. In an exemplary embodiment, the continuous fiber component can be formed of carbon fiber. For instance, the continuous fiber component can be a loose weave of carbon fiber tapes that are pre-formed using spot welding, and subsequently the formed weave is inserted into a mold for injection overmolding.

The fiber reinforced structures described herein exhibit various advantages over conventional structures that consist of composites or plastics (as is employed in conventional AR and/or VR glasses). With respect to structures formed of composites, the fiber reinforced structures described herein are lighter in weight than the structures formed of composites, are able to be manufactured more quickly than the structures formed of composites, and are able to be manufactured at a lower cost when compared to cost of manufacturing structures that consist of composites. In addition, a fiber reinforced structure can be designed such that the continuous fiber component is arranged to tailor mechanical reinforcement to where it is needed for structural support while minimizing weight (by reducing reinforcement where it is not needed for structural rigidity). With respect to structures formed of plastic, the fiber reinforced structures described herein provide greater structural rigidity when compared to the conventional plastic-only structures. Moreover, the continuous fiber component can provide heat dissipation, such that heat is dissipated throughout the component (rather than localized as occurs with plastics).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 6 illustrates yet another exemplary continuous fiber component.

DETAILED DESCRIPTION

Figure 1:
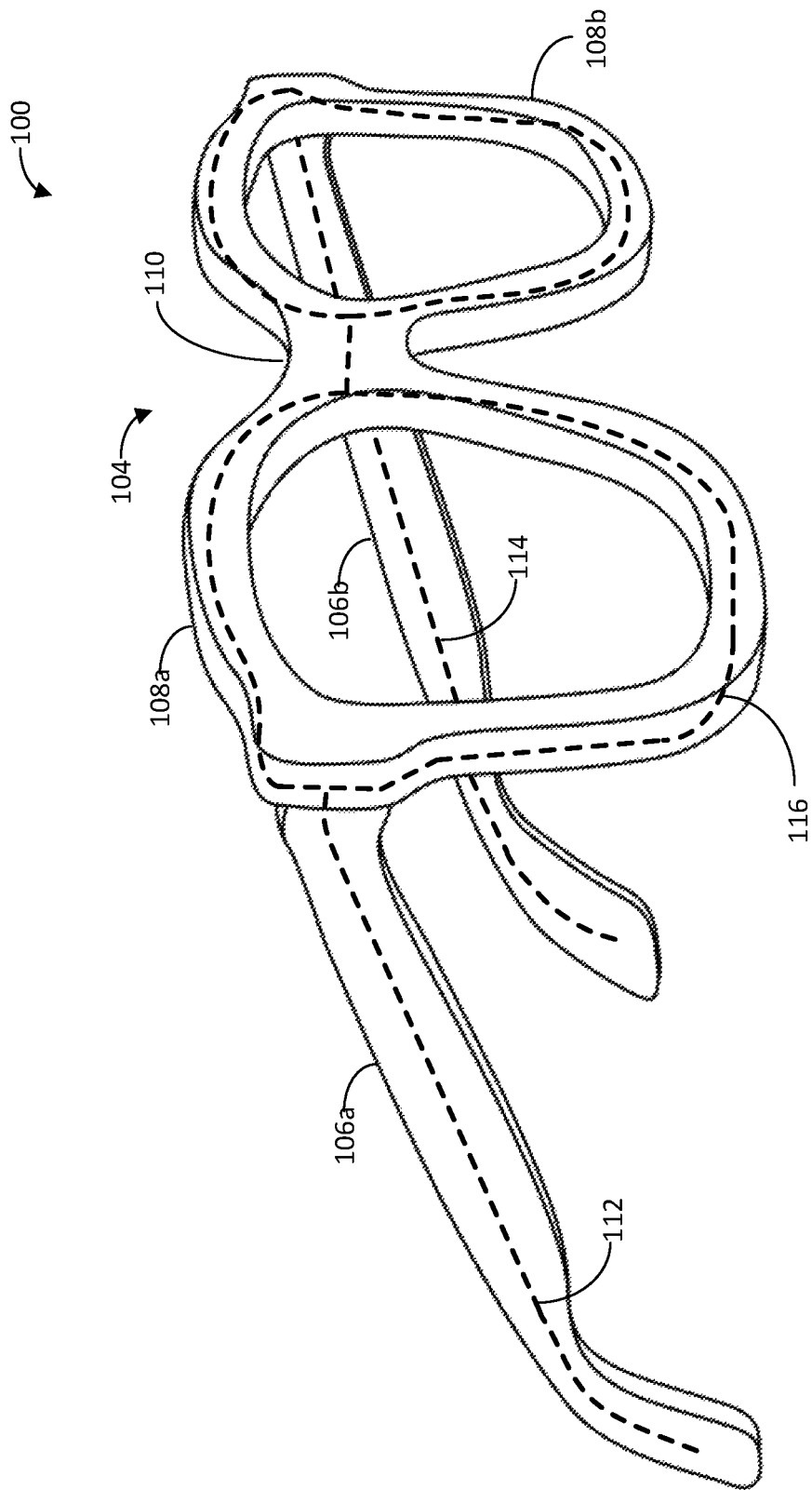
FIG. 1 illustrates exemplary fiber reinforced structures in AR and/or VR eyeglasses.

Various technologies pertaining to AR and/or VR glasses that include a structure reinforced with a continuous fiber component and a method of manufacturing the fiber reinforced structure are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or," That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

An exemplary conventional set of AR and/or VR glasses includes componentry that is formed entirely of a composite material, wherein manufacturing such componentry is both costly and time consuming. Another exemplary conventional set of AR and/or VR glasses includes componentry that is formed entirely of plastic, wherein manufacturing the plastic componentry is faster and less expensive than manufacturing composite componentry; however, the plastic componentry fails to adequately dissipate heat and is subject to breaking with a relatively small impact (e.g., an accidental drop may break the componentry).

Described herein are AR and/or VR glasses that include fiber reinforced structures, wherein a fiber reinforced structure includes a continuous fiber component over-molded with plastic. The fiber reinforced structures exhibit various advantages over the conventional composite-only and plastic-only structures conventionally included in AR and/or VR glasses. Specifically, the fiber reinforced structures can be manufactured more quickly and less expensively than composite-only structures. In addition, the fiber reinforced structures provide better structural rigidity than plastic-only structures, and the continuous fiber component can dissipate heat more readily than plastic.

With reference to FIG. 1, illustrated is a set of AR and/or VR glasses 100, wherein the AR and/or VR glasses 100 include portions formed of molded material that are reinforced with a continuous fiber component (which, in an example, can be a continuous fiber endoskeleton). By reinforcing the molded material with the continuous fiber component, structural rigidity and strength of the portions referenced above are increased relative to if the portions were formed entirely of plastic.

While not illustrated, the AR and/or VR glasses 100 can include numerous elements, such as one or more microprocessors, microcontrollers, ASICs, projection equipment (such as a scanning laser display system), a display surface positioned in the AR and/or VR glasses 100 such that imagery projected onto the display surface is viewable to a wearer of the AR and/or VR glasses 100 (wherein the display surface can be both see-through and configured to depict graphics projected thereon), an energy source (e.g., a battery), inertial sensors (such as a gyroscope, an accelerometer, etc.), a positioning sensor (such as a Global Positioning System sensor), a camera, a wireless transmitter, and so forth. Further, while the portions of the AR and/or VR glasses 100 that are fiber-reinforced are described herein as including frames and sidearms of the glasses 100, it is to be understood that the glasses 100 can include housings, brackets, fasteners, and/or other componentry that is fiber reinforced.

In the example depicted in FIG. 1, the glasses 100 include a frame 104 configured to rest on a user's nose and two sidearms 106a and 106b extending from the frame 104, wherein the sidearms 106a and 106b are configured to rest on the user's ears when the glasses 100 are worn on the user's face. The frame 104 comprises two rims 108a and 108b, each of which is configured to hold a lens. The frame 104 further includes a bridge 110 that rests on the user's nose and connects the rims 108a and 108b. The sidearms 106a and 106b may be hinged with respect to the frame 104 such that the sidearms 106a and 106b can bend with respect to the frame 104. In another example, the sidearms 106a and 106b may be fixed in the illustrated extended position. In another exemplary embodiment, the glasses 100 may fail to include the rims 108a and 108b; instead, the glasses 100 may include an upper support bar from which a unitary lens extends downward, wherein the bridge 110 may be incorporated into the lens. Other structures are also contemplated.

As noted above, one or more of the portions of the glasses 100 can include a continuous fiber component, such that the one or more portions are fiber reinforced. For instance, the first sidearm 106a can include a first continuous fiber component 112, the second sidearm 106b can include a second continuous fiber component 114, and the frames 104 can include a third continuous fiber component 116. While not shown, a portion of the glasses 100 can include multiple different continuous fiber components that are arranged in a portion, such that a continuous fiber component exists where additional strength and/or rigidity is desired. For example, the first sidearm 106a can include a first continuous fiber component at rearward location of the first sidearm 106a (e.g., where the first sidearm 106a fits over a right ear of a user), and the first sidearm 106b can additionally include a second continuous fiber component at a forward location of the first sidearm 106a (e.g., proximate to where the first sidearm 106a meets the frames 104). The first sidearm 106a may be free of a continuous fiber component between the rearward portion and the forward portion.

In addition to reinforcing the portions of the AR and/or VR glasses 100, the continuous fiber components 112, 114, and 116 can be configured to dissipate heat that is produced in proximity to such components 112, 114, and 116. As noted above, the glasses 100 include electronics that generate heat as such electronics operate. The continuous fiber components 112, 114, and 116 can be placed in the glasses proximate to heat sources and can be designed to allow for requisite heat dissipation, such that structure of plastic is not deleteriously impacted and further such that "hot spots" do not form on the glasses 106 that may cause user discomfort. For example, a portion of a continuous fiber component can be exposed, and heat-generating electronics can be positioned adjacent the exposed portion of the continuous fiber component, such that heat generated by the electronics is transferred to the continuous fiber component and dissipated throughout the continuous fiber component. Therefore, the continuous fiber components 112, 114, and 116 can act as both structural enhancement mechanisms and heat dissipation mechanisms.

The continuous fiber components 112, 114, and 116 can be made of any suitable continuous fiber composite material, and can have any suitable shape or pattern. For example, the continuous fiber composite material may comprise carbon fibers, such as pitch-based carbon fibers, polyacrylonitrile (PAN) based carbon fibers, and/or the like. In another example, the fiber composite material may include glass fibers, such as E-glass, S-glass, A-glass, and/or the like. In yet another example, the fiber composite material includes poly-paraphenylene terephthalamide or other suitable synthetic fiber. Further, the continuous fiber component 112, 114, and 116 can be formed by weaving continuous fibers, twisting continuous fibers, or the like.

The continuous fiber components 112, 114, and 116 may be made by way of any suitable technique. For instance, the components 112, 114, and 116 can be a plurality of fibers (e.g., carbon fibers) that are impregnated with a thermoset polymer (e.g., epoxy) to bond the fibers together, thereby forming the continuous fiber components. In another example, a bundle of fibers (e.g., carbon fibers) and a bundle of spun thermoplastic fibers (e.g., with approximately the same number of fibers as the bundle of (carbon) fibers) are comingled together to form a final bundle. This final comingled bundle can then be thermoformed to melt the thermoplastic fibers and bind the (carbon) fibers together. In yet another example, the continuous fiber components 112, 114, and 116 can be formed of a (loose) weave of carbon fiber tapes that are formed by way of spot welding.

Similarly, the molded material may comprise any suitable material for forming around or adjacent the components 112, 114, and 116 and for forming other portions of the glasses 100. For instance, the molded material may comprise a thermoplastic polymer, such as polycarbonate. The thermoplastic polymer may be a filled thermoplastic (e.g., glass filled, carbon filled, etc.) and/or an unfilled thermoplastic.

The material selected for the molded material may be a function of the technique used to mold the material around or adjacent the components 112, 114, and 116. For instance, the technique may be injection molding, compression molding, calendaring, extrusion, and the like.

The following discussion describes using injection molding to form the sidearms 106a and 106b and the frames 104; however any of the other techniques mentioned above may be employed in addition to or in lieu of injection molding. A formed continuous fiber component can inserted into a mold cavity, and then the molding material can be injected into the mold cavity where it forms around the continuous fiber component, cools, and hardens to form a fiber-reinforced structure (e.g., one of the sidearms 106a or 106b). The formed component, when positioned in the mold, may additionally be aligned within the mold for increased strength of the structure 100 along particular alignments.

The components 112, 114, and 116 can take any suitable shape for reinforcing the portions of the glasses 100 that include such components and/or for dissipating heat throughput portions of the glasses 100. Additionally, the components 112, 114, and 116 may have the same shape and structure or may have different shapes and structures. For example, the component 112 may be a loose weave of continuous fibers, while the component 116 may be twisted continuous fibers.

Figure 3:
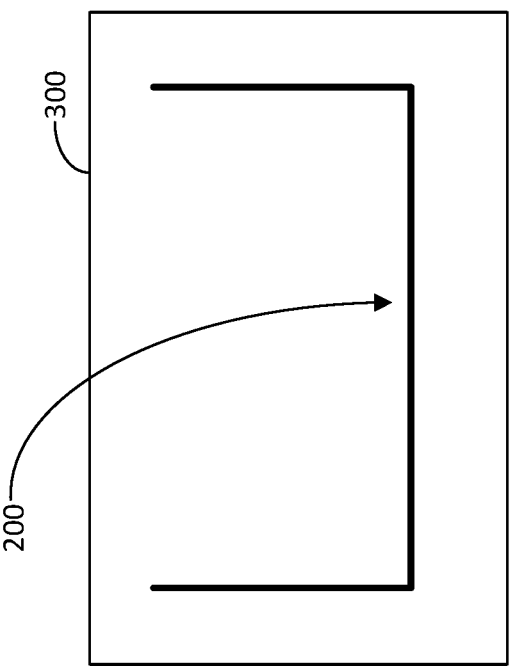
FIG. 3 illustrates an exemplary continuous fiber component over-molded with molding material.
Figure 2:
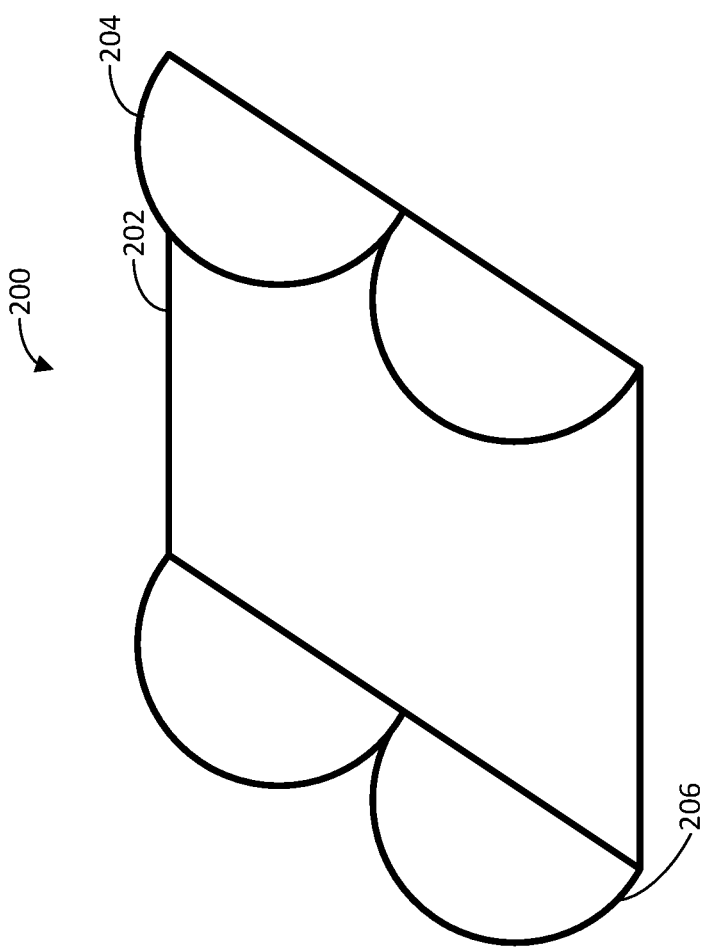
FIG. 2 depicts an exemplary continuous fiber component included in a fiber reinforced structure.

Turning now to FIGS. 2-6, illustrated are various examples of one or more of the components 112, 114, and 116. With reference more specifically to FIGS. 2 and 3, a portion of an exemplary continuous fiber component 200 is depicted. The component 200 includes a first planar section 202, a second section 204 that extends at an angle from a first edge of the first planar section 202, and a third section 206 that extends at a second angle from a second edge of the first planar section 202. The angle and the second angle can be similar, as illustrated, or can be different. The first section 202, the second section 204, and the third section 206 can take any suitable shapes. For instance, the second section 204 and the third section 206 can have arched portions that extend orthogonally from the first planar section 202.

FIG. 3 illustrates the exemplary component 200 overmolded with a molding material 300 that forms a portion of the glasses 100 (e.g., the sidearms 106a-106b or the frames 104). In the illustrated example, the entire cross-section of the component 200 is surrounded by the molding material 300. In another example, a portion of the cross-section of the component 200 may be exposed.

The component 200 may be arranged at any suitable orientation in the glasses 100. For instance, the continuous fiber component 200 may be orientated such that the second section 204 and/or the third section 206 extend away from a face of the user when the user wears the glasses. The second section 204 and third section 206 provide additional surface area for the molding material 300 to bond to when introduced into a mold that includes the component 200.

Figure 4:
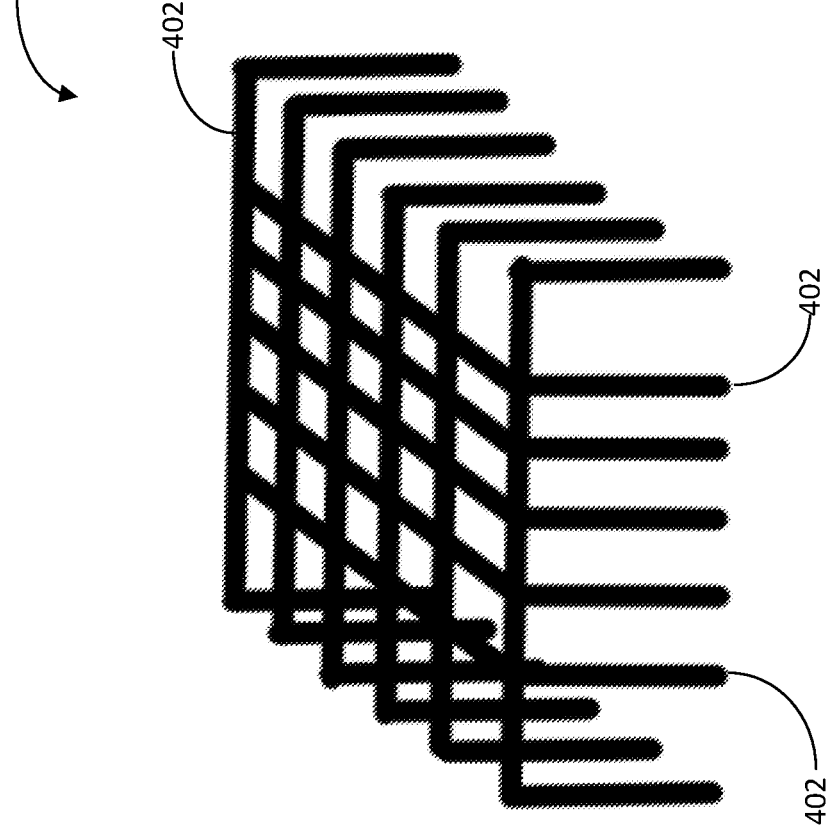
FIG. 4 illustrates another exemplary continuous fiber component included in a fiber reinforced structure.

Turning now to FIG. 4, another exemplary component 400 that can be subjected to over-molding and included in the glasses 100 is depicted. The component 400 is formed as a mesh that includes a matrix of overlapping fibers, wherein the mesh includes a plurality of voids between the overlapping fibers. More particularly, in the illustrated example, the component 400 comprises a plurality of overlapping fibers 402 that are arranged perpendicularly into a mesh. The mesh may be then formed into any suitable shape. For instance, as depicted, the component 400 is an open-ended rectangular box with the overlapping mesh forming the top surface and uncrossed parts of the fibers bent to form four sides of the box.

Figure 5:
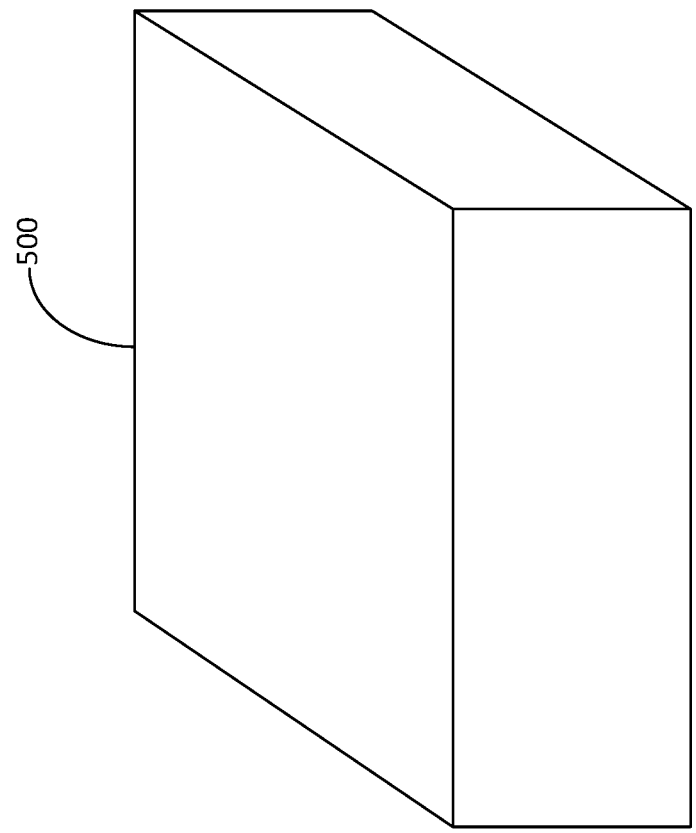
FIG. 5 depicts another exemplary continuous fiber component over-molded with molding material.

FIG. 5 illustrates the exemplary component 400 overmolded with a molding material 500 that forms a portion of the glasses 100. Because of the voids in the component 400, the molding material 500 passes through such voids to enhance the bonding between the molding material 500 and the component 400, similar to reinforced concrete. Similar to the component 200 depicted in FIG. 2, the component 400 may be arranged at any suitable orientation in the formed glasses 100.

Turning now to FIG. 6, an exemplary continuous fiber brace 600 is illustrated, wherein the brace 600, rather than acting as an endoskeleton, acts as a brace between opposing walls 600 and 602. Hence, the brace 600 is not subjected to over-molding, but rather, for example, acts as a structural support for plastic walls.

Figure 7:
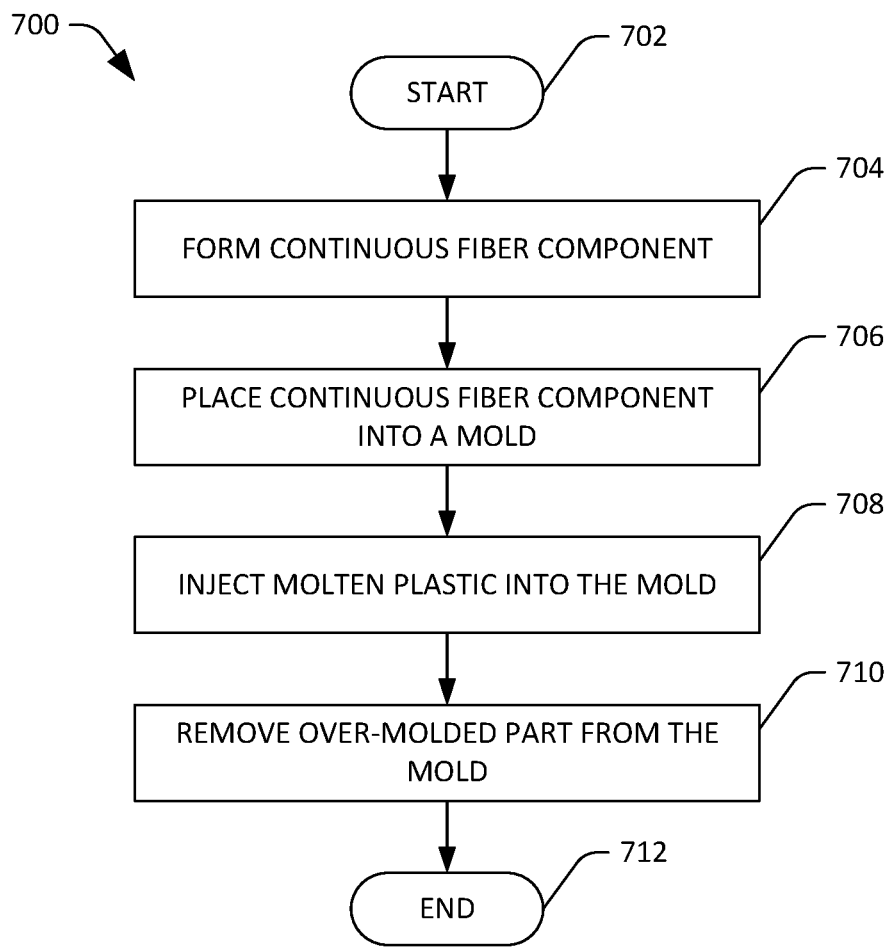
FIG. 7 is a flow diagram illustrating an exemplary methodology for manufacturing a fiber reinforced structure for use in AR and/or VR headsets.
Figure 8:
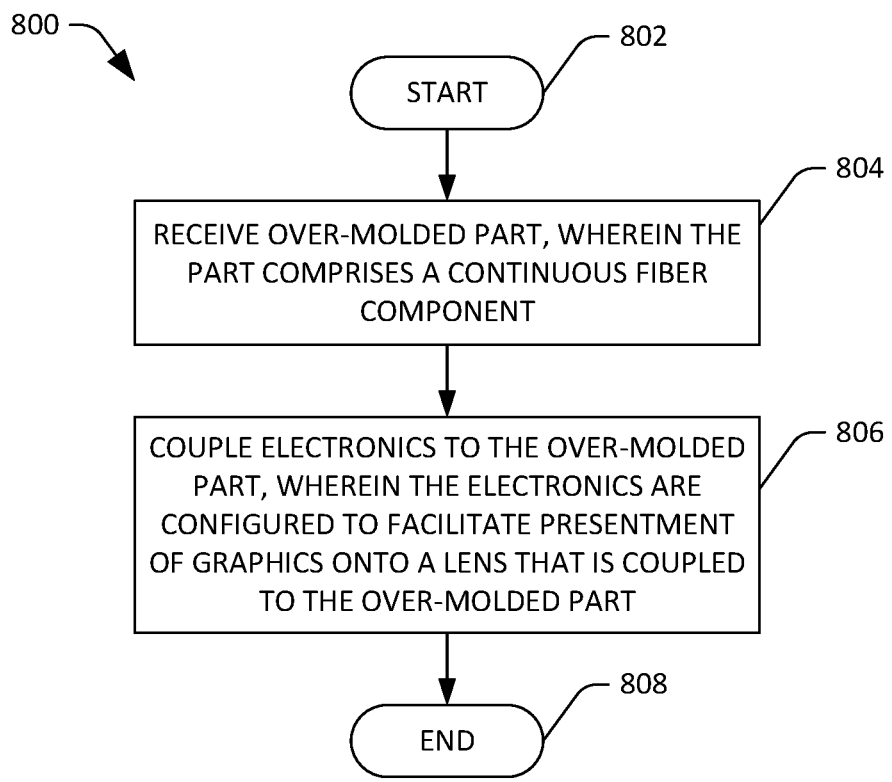
FIG. 8 is a flow diagram illustrating an exemplary methodology for manufacturing an AR and/or VR headset.

FIGS. 7 and 8 illustrate exemplary methodologies relating to manufacturing and use of AR and/or VR glasses. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now solely to FIG. 7, an exemplary methodology 700 for manufacturing a fiber re-enforced structured that is included in AR and/or VR glasses is illustrated. The methodology 700 starts at 702, and at 704 a continuous fiber component (e.g., a continuous fiber endoskeleton) is formed. For instance, the continuous fiber component can be formed of carbon fiber and can be formed into a shape that corresponds to a plastic injection molding mold. At 706, the continuous fiber component is placed into the mold, and at 708 molten plastic is injected into the mold. The molten plastic cools and hardens around the continuous fiber component, and at 710 a plastic injection-molded part, with the continuous fiber component included therein, is removed from the mold. In an example, the part can be relatively small, with at least one of a height, width, or length being between 1 mm and 5 mm. In another example, the at least one of the height, width, or length can be between 5 mm and 10 mm. Thus, the part can be relatively small but have structural properties that enable the part to withstand impacts, such as the part being dropped to the ground. The methodology 700 completes at 712.

With reference now to FIG. 8 an exemplary methodology 800 for manufacturing AR and/or VR glasses is illustrated. The methodology 800 starts at 802, and at 804 an over-molded part is received, wherein the over-molded part includes a continuous fiber component with plastic molded thereover. The over-molded part can be manufactured in accordance with the methodology 700 illustrated in FIG. 7. Further, the continuous fiber component, in an example, can be composed of carbon fiber or other suitable continuous fiber.

At 806, electronics are coupled to the over-molded part, wherein the electronics can be, for example, a projection system, a digital signal processor, a microprocessor, a sensor system (which can include one or more sensors), a system on chip (SoC) module, a wireless transceiver, a camera, a microcontroller, an ASIC, or other suitable electronics. The continuous fiber component in the over-molded part can act to dissipate heat generated by the electronics when such electronics are operational. The methodology 800 completes at 808.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A set of augmented reality (AR) or virtual reality (VR) glasses, the glasses comprising:
   a fiber reinforced structure, comprising:
      a continuous fiber component that comprises a continuous fiber material; and
      a thermoplastic material injection molded over the continuous fiber component, wherein the thermoplastic material surrounds the continuous fiber component; and
   electronics that are coupled to the fiber reinforced structure, wherein the electronics are configured to facilitate presentment of imagery onto a lens of the glasses.

2. The glasses of claim 1, wherein the continuous fiber material comprises carbon fiber material, and further wherein the carbon fiber material comprises pitch-based carbon fibers.

3. The glasses of claim 1, wherein the continuous fiber component comprises a plurality of fibers impregnated with a thermoset polymer.

4. The glasses of claim 1, wherein the thermoplastic material comprises a filled type of plastic.

5. The glasses of claim 4, wherein the filled type of plastic comprises a glass-filled polymer.

6. The glasses of claim 1, wherein the fiber reinforced structure is frames of the glasses.

7. The glasses of claim 1, wherein the fiber reinforced structure is a sidearm of the glasses.

8. The glasses of claim 1, wherein the continuous fiber component comprises a mesh layer, wherein the mesh layer is formed from a plurality of overlapping carbon fibers, wherein the mesh layer has a plurality of voids between the carbon fibers.

9. The glasses of claim 1, wherein the continuous fiber component comprises a first section, a second section extending at an angle from a first edge of the first section, and a third section extending at a second angle from a second edge of the first section.

10. The glasses of claim 1, wherein the continuous fiber component comprises carbon fibers that are twisted with one another.

11. The glasses of claim 1, wherein the continuous fiber material is a glass fiber.

12. The glasses of claim 1, wherein the continuous fiber material is poly-paraphenylene terephthalamide.

13. A method for forming a fiber reinforced structure that is to be included in a set of augmented reality (AR) glasses or virtual reality (VR) glasses, the method comprising:
   forming a carbon fiber component, wherein the carbon fiber component comprises carbon fiber material;
   inserting the carbon fiber component into a mold; and
   injecting a thermoplastic material into the mold while the carbon fiber component is inserted in the mold, wherein the thermoplastic material surrounds the carbon fiber component in the mold, and further wherein the fiber reinforced structure is included as a part of the glasses.

14. The method of claim 13, wherein forming the carbon fiber component comprises:
    comingling a bundle of carbon fibers and a bundle of thermoplastic fibers to form a comingled bundle; and
    thermoforming the comingled bundle by melting a portion of the thermoplastic fibers.

15. The method of claim 13, wherein forming the carbon fiber component comprises:
    forming a mesh layer of carbon fibers, wherein the mesh layer comprises a plurality of overlapping carbon fibers, wherein the mesh layer has a plurality of voids between the carbon fibers.

16. The method of claim 13, wherein the fiber reinforced structure has at least one of a height, length, or width of between 5 mm and 10 mm.

17. The glasses of claim 16, wherein the continuous fiber component comprises pitch-based carbon fibers.

18. A pair of augmented reality glasses comprising:
    a sidearm that is fiber-reinforced, wherein the sidearm comprises:
        a continuous fiber component that comprises a continuous fiber material; and
        a thermoplastic material injection molded over the continuous fiber component, wherein the thermoplastic material surrounds the continuous fiber component; and
    a lens coupled to the sidearm, wherein the lens is configured to present computer-generated imagery thereon.

19. The glasses of claim 18, wherein the continuous fiber component comprises carbon fiber.

20. The glasses of claim 18, further comprising:
    electronics coupled to the sidearm, wherein the electronics facilitate presentment of the computer-generated imagery on the lens.

* * * * *